US 010025578B2

United States Patent
Jimbo

(10) Patent No.: US 10,025,578 B2
(45) Date of Patent: Jul. 17, 2018

(54) INFORMATION PROCESSING SYSTEM AND METHOD ON A CLIENT SERVER ENVIRONMENT FOR SOFTWARE DOWNLOAD

(71) Applicant: Junya Jimbo, Tokyo (JP)

(72) Inventor: Junya Jimbo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/158,041

(22) Filed: May 18, 2016

(65) Prior Publication Data

US 2016/0371070 A1 Dec. 22, 2016

(30) Foreign Application Priority Data

Jun. 18, 2015 (JP) .................................. 2015-123229
May 10, 2016 (JP) .................................. 2016-094572

(51) Int. Cl.
*G06F 9/445* (2018.01)
*G06F 8/61* (2018.01)
(Continued)

(52) U.S. Cl.
CPC .............. *G06F 8/61* (2013.01); *G06F 3/0482* (2013.01); *G06F 17/30598* (2013.01);
(Continued)

(58) Field of Classification Search
CPC ...................................................... G06F 8/61
(Continued)

(56) References Cited

U.S. PATENT DOCUMENTS 5,684,996 A * 11/1997 Westerholm .............. G06F 8/61
713/100
5,845,078 A * 12/1998 Tezuka ................ H04L 41/0806
709/222
(Continued)

FOREIGN PATENT DOCUMENTS

JP 2010-182309 8/2010
WO WO-2014/028606 A1 2/2014

OTHER PUBLICATIONS

Beloglavec et al, "Analysis of the Limitations of Multiple Client Handling in a Java Server Environment", ACM SIGPLAN Notices, vol. 40(4), pp. 20-28, 2005.*

(Continued)

*Primary Examiner* — Anil Khatri
(74) *Attorney, Agent, or Firm* — Harness, Dickey & Pierce, P.L.C.

(57) ABSTRACT

An information processing system includes at least one device and a server system. The server system includes a provision control unit, a first generation unit, a message screen request reception unit, a second generation unit, and a message screen transmission unit. The first generation unit generates first correspondence information in which each device is associated with an application not yet provided to the device. The message screen request reception unit receives a message screen request from the device. The second generation unit generates a message screen based on the first correspondence information. The message screen transmission unit transmits the message screen to the device in response to the message screen request. The device includes a message screen request transmission unit, a message screen reception unit, and a message screen display unit. The message screen display unit displays the message screen received by the message screen reception unit.

13 Claims, 20 Drawing Sheets

(51) Int. Cl.
| | | |
|---|---|---|
| G06F 3/0482 | (2013.01) | |
| G06F 17/30 | (2006.01) | |
| H04L 12/58 | (2006.01) | |
| H04L 29/08 | (2006.01) | |
| H04N 1/00 | (2006.01) | |
| G06F 8/38 | (2018.01) | |

(52) U.S. Cl.
CPC ............. *H04L 51/24* (2013.01); *H04L 67/34* (2013.01); *H04N 1/00066* (2013.01); *H04N 1/00344* (2013.01); *G06F 8/38* (2013.01); *H04N 2201/0039* (2013.01); *H04N 2201/0094* (2013.01)

(58) Field of Classification Search
USPC .................................. 717/168–178; 709/203
See application file for complete search history.

(56) References Cited

U.S. PATENT DOCUMENTS

| | | | | | |
|---|---|---|---|---|---|
| 6,151,707 | A * | 11/2000 | Hecksel | ................... | G06F 8/61 717/178 |
| 7,734,717 | B2 * | 6/2010 | Saarimaki | ................. | G06F 8/65 709/201 |
| 7,822,809 | B2 * | 10/2010 | Dhupelia | ................ | A63F 13/12 463/24 |
| 7,865,888 | B1 * | 1/2011 | Qureshi | ................. | G06N 5/048 717/168 |
| 7,926,033 | B2 * | 4/2011 | Gopal | ....................... | G06F 8/68 709/220 |
| 8,245,221 | B2 * | 8/2012 | Czeisler | .................. | H04L 67/34 709/200 |
| 8,387,039 | B2 * | 2/2013 | Goring | ..................... | G06F 8/20 717/103 |
| 8,712,848 | B2 * | 4/2014 | Jacobs | ................. | G06Q 10/107 705/14.4 |
| 8,726,270 | B2 * | 5/2014 | Kane | ........................ | G06F 8/61 717/171 |
| 8,745,617 | B1 * | 6/2014 | Stekkelpak | ......... | G06F 9/44505 717/173 |
| 8,781,828 | B2 * | 7/2014 | Park | ........................ | G10L 15/26 341/176 |
| 8,910,146 | B2 * | 12/2014 | Emejulu | ............ | G06Q 10/1091 717/133 |
| 8,914,790 | B2 * | 12/2014 | Farrell | .................. | G06Q 30/02 705/901 |
| 9,027,015 | B2 * | 5/2015 | Hildebrandt | ........... | G06Q 10/10 710/1 |
| 9,851,962 | B2 * | 12/2017 | Boss | ........................ | G06F 8/61 |
| 2010/0146442 | A1 | 6/2010 | Nagasaka et al. | | |
| 2010/0205274 | A1 | 8/2010 | Gharabally et al. | | |
| 2013/0139163 | A1 | 5/2013 | Nagasaka et al. | | |
| 2014/0052683 | A1 | 2/2014 | Kirkham et al. | | |
| 2014/0149976 | A1 | 5/2014 | Yagiura et al. | | |
| 2015/0095902 | A1 | 4/2015 | Boss et al. | | |
| 2016/0154641 | A1 | 6/2016 | Kirkham et al. | | |
| 2016/0291954 | A1 | 10/2016 | Boss et al. | | |

OTHER PUBLICATIONS

Schimkat et al, "A Lightweight, Message-Oriented Application Server for WWW" ACM, pp. 934-941, 2000.*

Jianmin et al, "A Message-based Real-Time Model by Object-Oriented Technique", ACM SIGOPS Operating Systems Review: vol. 31 Issue 3, pp. 45-51,1997.*

Negara et al, "Inferring Ownership Transfer for Efficient Message Passing", ACM, pp. 81-90, 2011.*

McBride, "Security Considerations for Active Messages", ACM, pp. 463-467, 1996.*

Ji et al, "A Cost-Efficient Partially-Parallel Irregular LDPC Decoder Based on Sum-Delta Message Passing Algorithm", ACM, pp. 207-212, 2008.*

Extended European Search Report dated Oct. 20, 2016 for corresponding European Application No. 16174181.4.

S. Radhika, "Document Extractor—Combi Monitor, Screen & Printer by Byeong Min ChoeYanko Design," Nov. 28, 2010, XP055395394, https://web.archive.org/web/20101128062636/http://www.yankodesign.com:80/2010/11/25/print-that-screen-literally/, [retrieved on Aug. 2, 2017].

N. Lopez, "HP Introduces the Quirky Sprout All-in-One Computer with a Built in Projector and 3D Scanner," Jan. 7, 2015, XP055395129, https://web.archive.org/web/20150107143707/https://thenewxtweb.com/insider/2014/10/29/hp-introduces-quirky-sprout-one-built-projector-3d-scanner/, [retrieved on Aug. 2, 2017].

Office Action from corresponding European patent application 16174181.4, dated Aug. 8, 2017.

Summons to attend oral proceedings pursuant to Rule 115(1) EPC issued May 7, 2018 by the European Patent Office for EP Application No. 16174181.4.

Cherlynn Low, "How to Set Up Auto Forwarding in Outlook 2013" LAPTOP, https://www.laptopmag.com/articles/how-to-set-up-auto-forwarding-in-outlook-2013, Aug. 20, 2013.

* cited by examiner installer://installApp?id=49354

FIG.10

| DEVICE ID | APPLICATION INFORMATION (PROVIDED DATE AND TIME: APPLICATION NAME) |
|---|---|
| 1003 | 2015/01/23: EASY PRINT APPLICATION |
| | 2015/01/23: EMAIL TRANSMISSION APPLICATION |
| | 2015/03/20: DATA OVERWRITE ERASURE APPLICATION |
| 1010 | 2015/04/13: SCANNED IMAGE SHARING APPLICATION |
| 1011 | 2015/04/13: SCANNED IMAGE SHARING APPLICATION |
| 1230 | 2015/05/23: EASY PRINT APPLICATION |

FIG.11

| DEVICE ID | MESSAGE INFORMATION |
|---|---|
| 1003 | CHARACTER STRING: NEWLY ARRIVED APPLICATION INFORMATION |
| | CHARACTER STRING: EASY PRINT APPLICATION IS RELEASED |
| | IMAGE: ICON IMAGE OF EASY PRINT APPLICATION |
| | CHARACTER STRING: FOR DETAILS, TAP HERE!! |
| | CHARACTER STRING: https://xxx.com |

| APPLICATION NAME | PROVIDED NUMBER |
|---|---|
| NAME CARD PRINTING APPLICATION | 11 |
| NAME CARD CAPTURING APPLICATION | 2 |
| TAX RETURN APPLICATION | 3 |
| RESIDENCE CARD COPY APPLICATION | 12 |
| ENVELOPE APPLICATION | 51 |
| POST CARD APPLICATION | 28 |
| ⋮ | ⋮ |

FIG.19

| DEVICE ID | MESSAGE INFORMATION |
|---|---|
| 1003 | CHARACTER STRING: TOP 5 RECOMMENDED APPLICATIONS |
| | CHARACTER STRING: FIRST ENVELOPE APPLICATION MOST USED APPLICATION! |
| | CHARACTER STRING: SECOND POST CARD APPLICATION |
| | CHARACTER STRING: THIRD RESIDENCE CARD COPY APPLICATION |
| | CHARACTER STRING: FOURTH NAME CARD PRITING APPLICATION |
| | CHARACTER STRING: FIFTH TAX RETURN APPLICATION |
| | CHARACTER STRING: FOR DETAILS, TAP HERE!! |
| | CHARACTER STRING: https://xxx.com |

FIG.20

TOP 5 RECOMMENDED APPLICATIONS

FIRST    ENVELOPE APPLICATION
              MOST USED APPLICATION!

SECOND  POST CARD APPLICATION

THIRD    RESIDENCE CARD COPY APPLICATION

FOURTH  NAME CARD PRITING APPLICATION

FIFTH    TAX RETURN APPLICATION https://xxx.com ←FOR DETAILS, TAP HERE!!

FIG.21

| APPLICATION NAME | PROVIDED NUMBER | DEVICE ID |
|---|---|---|
| NAME CARD PRINTING APPLICATION | 11 | 1003,1004,⋯ |
| NAME CARD CAPTURING APPLICATION | 2 | 1001,1003 |
| TAX RETURN APPLICATION | 3 | 1001,1004,1005 |
| ⋮ | ⋮ | ⋮ |

FIG.23

| APPLICATION NAME | CATEGORY INFORMATION |
|---|---|
| NAME CARD PRINTING APPLICATION | NAME CARD MANAGEMENT |
| NAME CARD CAPTURING APPLICATION | NAME CARD MANAGEMENT |
| TAX RETURN APPLICATION | PUBLIC SERVICE REGISTRATION |
| RESIDENCE CARD COPY APPLICATION | PUBLIC SERVICE REGISTRATION |
| ENVELOPE APPLICATION | ADDRESS PRINTING |
| POST CARD APPLICATION | ADDRESS PRINTING |
| ⋮ | ⋮ |

| DEVICE ID | MESSAGE INFORMATION |
|---|---|
| 1003 | CHARACTER STRING: TOP 3 "NAME CARD MANAGEMENT" CATEGORY RECOMMENDED APPLICATIONS |
| | CHARACTER STRING: FIRST NAME CARD PRINTING APPLICATION MOST USED APPLICATION! |
| | CHARACTER STRING: SECOND NAME CARD CAPTURING APPLICATION |
| | CHARACTER STRING: THIRD |
| | CHARACTER STRING: FOR DETAILS, TAP HERE!! |
| | CHARACTER STRING: https://xxx.com |

| Subject: RECOMMENDED APPLIATION INFORMATION FOR MFP |

TEXT:
NEWLY ARRIVED APPLICATION INFORMATION!
EASY PRINT APPLICATION IS RELEASED!!

EASY PRINT

FOR DETAILS, TAP HERE!!
https://xxx.com

INFORMATION PROCESSING SYSTEM AND METHOD ON A CLIENT SERVER ENVIRONMENT FOR SOFTWARE DOWNLOAD

CROSS-REFERENCE TO RELATED APPLICATIONS

The present application claims priority under 35 U.S.C. § 119 to Japanese Patent Applications No. 2015-123229 filed on Jun. 18, 2015 and No. 2016-094572 filed on May 10, 2016. The contents of which are incorporated herein by reference in their entirety.

BACKGROUND OF THE INVENTION

1. Field of the Invention

The present invention relates to information processing systems and information processing methods.

2. Description of the Related Art

A known system allows an application to be downloaded and installed from a web page provided by a web server.

For example, Japanese Unexamined Patent Application Publication No. 2010-182309 discloses a technology in which an application description page having displayed thereon a download button (virtual button) for requesting a download of an application, for each of a plurality of the applications held in a server, is provided from the server to a computer device (client device), and is displayed on a display unit of the computer device. When the download button of the application description page is selected, the download is permitted as long as the computer device is supporting the selected application.

However, in the technology disclosed in Japanese Unexamined Patent Application Publication No. 2010-182309, the user cannot identify what kind of applications are registered unless the user browses through the entire application description page. Consequently, there is a problem in that the user may overlook an application useful to the user or an application registered anew.

SUMMARY OF THE INVENTION

According to one aspect of the present invention, an information processing system includes at least one device and a server system that includes at least one server coupled to the device via a network. The server system includes a provision control unit, a first generation unit, a message screen request reception unit, a second generation unit, and a message screen transmission unit. The provision control unit performs control to provide any of a plurality of applications held by the server system to the device. The first generation unit generates first correspondence information in which each device is associated with an application not yet provided to the device. The message screen request reception unit receives, from the device, a message screen request for requesting a message screen that is a screen used to notify a user of the application not yet provided to the device. The second generation unit generates the message screen corresponding to the device that is a requestor of the message screen request received by the message screen request reception unit, based on the first correspondence information generated by the first generation unit. The message screen transmission unit transmits the message screen generated by the second generation unit to the device, in response to the message screen request. The device includes a message screen request transmission unit, a message screen reception unit, and a message screen display unit. The message screen request transmission unit transmits the message screen request to the server system. The message screen reception unit receives the message screen from the server system. The message screen display unit performs control to display the message screen received by the message screen reception unit.

BRIEF DESCRIPTION OF THE DRAWINGS

FIG. 10 is a diagram illustrating exemplary second correspondence information;

FIG. 11 is a diagram illustrating exemplary first correspondence information;

FIG. 19 is a diagram illustrating exemplary first correspondence information according to the second embodiment;

FIG. 20 is a diagram illustrating an exemplary message screen according to the second embodiment;

FIG. 21 is a diagram illustrating exemplary second correspondence information of a modification according to the second embodiment;

FIG. 23 is a diagram illustrating exemplary application classification information;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
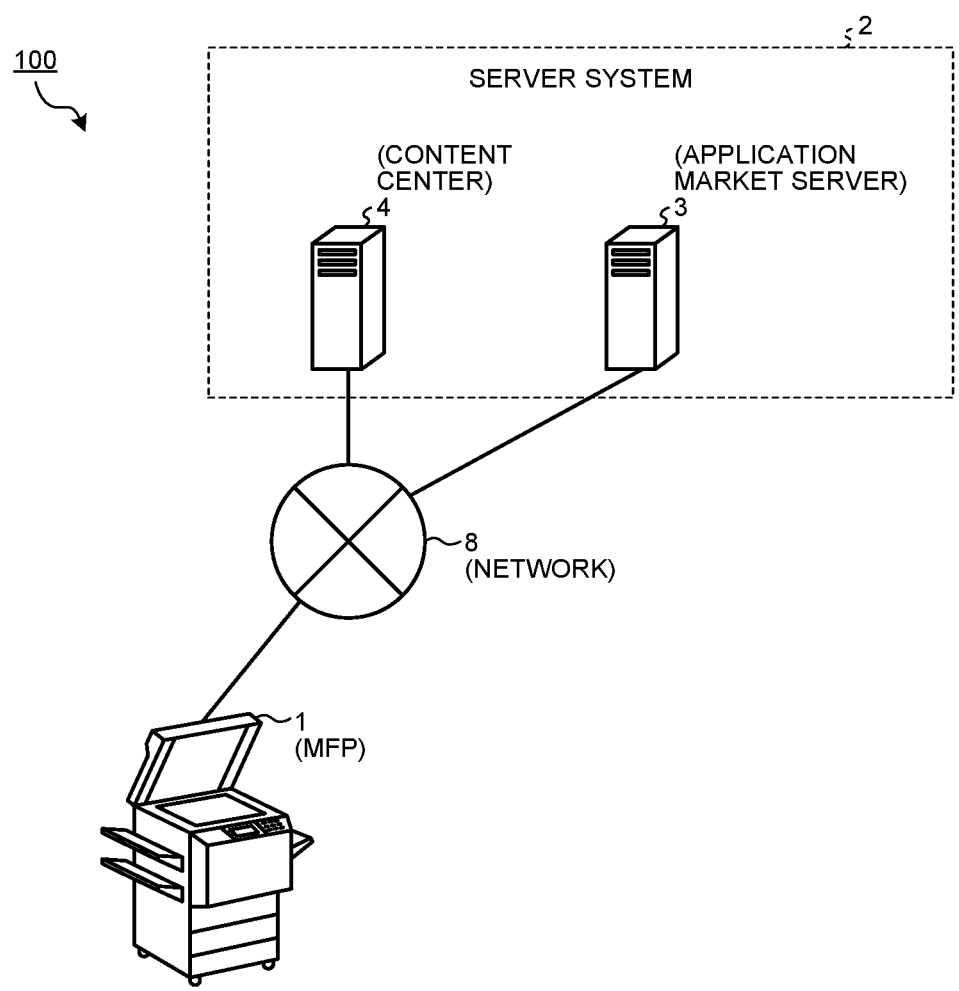
FIG. 1 is a schematic diagram illustrating an exemplary structure of an information processing system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention will be described in detail below with reference to the drawings.

An object of an embodiment is to provide an information processing system capable of preventing a user from overlooking an application useful to the user or an application registered anew.

The following details an information processing system and an information processing method in embodiments according to the present invention with reference to the accompanying drawings. A multifunction peripheral (MFP) will hereunder be described as an exemplary device included in an information processing system according to the present invention; however, the MFP is not limited thereto. It is noted that the MFP has a plurality of functions, including a copier function, a scanner function, a printer function, and a facsimile function.

First Embodiment

FIG. 1 is a schematic diagram illustrating an exemplary structure of an information processing system 100 according to the present embodiment. As illustrated in FIG. 1, the information processing system 100 includes an MFP 1 and a server system 2. The MFP 1 and the server system 2 are coupled to each other via a network 8.

For convenience sake, in the example of FIG. 1, MFP 1 is illustrated as a device included in the information processing system 100. However, it is not limited thereto, and the number and the types of the devices included in the information processing system 100 are optional. In other words, the information processing system 100 may include at least one or more devices.

The server system 2 has a function of providing (transmitting), to the MFP 1, an application list screen including a button to which an instruction to install an application to the MFP 1 is attached, based on a request from the MFP 1. The server system 2 also has a function of providing one of a plurality of applications to the MFP 1, a function of providing a message screen, which will be described below, to the MFP 1, and the like. In this example, the server system 2 includes an application market server 3 and a content center 4. The details thereof will be described below. In this example, an application ("application market application") that provides a function of acquiring an application list screen from the server system 2 and displaying the acquired application list screen on the MFP 1 is installed in the MFP 1 in advance. An application ("installer") that provides a function of executing an installation instruction attached to the button pressed by the user among the buttons on the application list screen, and installing the application in the MFP 1 is also installed in the MFP 1 in advance. Further, an application ("content application") that provides a function of acquiring a message screen, which will be described below, from the server system 2 and displaying the acquired message screen on the MFP 1 is installed in the MFP 1 in advance. The function of the application market application and the function of the content application are implemented by using an application that provides the function of a Web browser. Thus, the application market application and the content application may be collectively referred to as a "browser application". The details of the MFP 1 will be described below.

Figure 2:
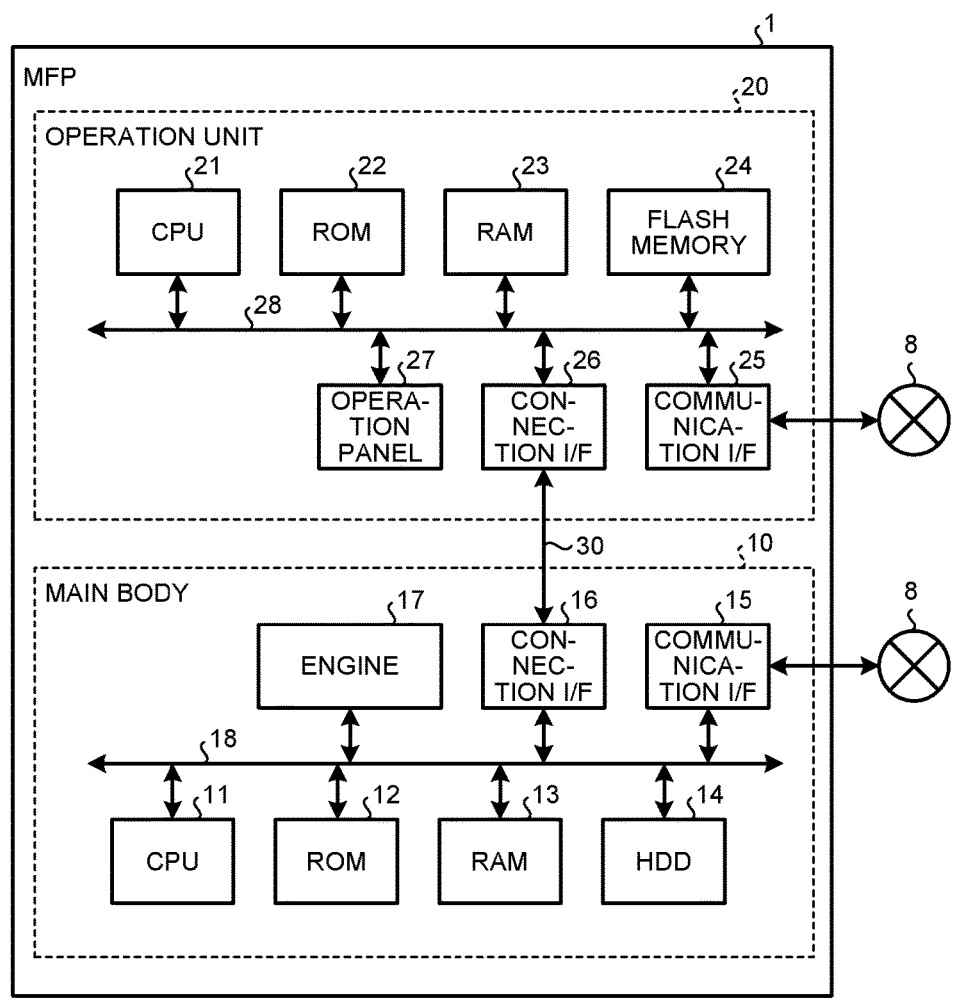
FIG. 2 is a diagram illustrating an exemplary hardware structure of an MFP.

FIG. 2 is a diagram illustrating an exemplary hardware structure of the MFP 1. As illustrated in FIG. 2, the MFP 1 includes a main body 10 that can implement various functions such as copier, scanner, facsimile, and printer functions, and an operation unit 20 that receives operation from the user. The main body 10 and the operation unit 20 are connected via a dedicated communication path 30 so as to enable communication with each other. The communication path 30 is compliant with a universal serial bus (USB) standard, for example. The communication path 30 may be compliant with any standard regardless of a wireless or wired communication scheme.

The main body 10 can operate in accordance with the input received by the operation unit 20. The main body 10 can communicate with an external apparatus such as a client personal computer (PC) and also operate in accordance with an instruction received from the external apparatus.

The following describes a hardware structure of the main body 10. As illustrated in FIG. 2, the main body 10 includes a central processing unit (CPU) 11, a read-only memory (ROM) 12, a random-access memory (RAM) 13, a hard disk drive (HDD) 14, a communication interface (I/F) 15, a connection I/F 16, and an engine 17. These components are connected with one another via a system bus 18.

The CPU 11 integrally controls the operation of the main body 10. The CPU 11 executes a computer program stored in the ROM 12 or the HDD 14, for example, using the RAM 13 as a work area to control the overall operation of the main body 10, thereby implementing the various functions such as the copier, scanner, facsimile, and printer functions.

The communication I/F 15 is an interface to connect the main body 10 to the network 8. The connection I/F 16 is an interface that makes the main body 10 communicate with the operation unit 20 via the communication path 30.

The engine 17 is hardware that performs versatile information processing and processing other than communication for implementing the copier, scanner, facsimile, and printer functions. The engine 17 includes a scanner (image reading section) that scans and reads an image on a document, a plotter (image forming section) that performs printing on a sheet material such as a sheet, and a facsimile section that performs facsimile communication, for example. The engine 17 may further include specific options such as a finisher that sorts the sheet materials after printing and an automatic document feeder (ADF) that automatically feeds documents.

The following describes a hardware structure of the operation unit 20. As illustrated in FIG. 2, the operation unit 20 includes a CPU 21, a ROM 22, a RAM 23, a flash memory 24, a communication I/F 25, a connection I/F 26, and an operation panel 27. These components are connected with one another via a system bus 28.

The CPU 21 integrally controls the operation of the operation unit 20. The CPU 21 executes a computer program stored in the ROM 22 or the flash memory 24, for example, using the RAM 23 as a work area to control the overall operation of the operation unit 20, thereby implementing various functions such as displaying of information (images) according to the input received from the user, which are described later.

The communication I/F 25 is an interface to connect the operation unit 20 to the network 8. The connection I/F 26 is an interface that makes the operation unit 20 communicate with the main body 10 via the communication path 30.

The operation panel 27 receives various types of input according to the user's operation and displays various types of information (e.g., information according to the received input, information indicating an operation status of the MFP 1, and information indicating a setting condition). While in this example, the operation panel 27 includes a liquid crystal display (LCD) having a touch panel function, the embodiment is not limited thereto. For example, the operation panel 27 may include an organic electroluminescence (EL) display having a touch panel function. Furthermore, the operation panel 27 may be provided with an operation unit such as hardware keys and a display unit such as a lamp.

Figure 3:
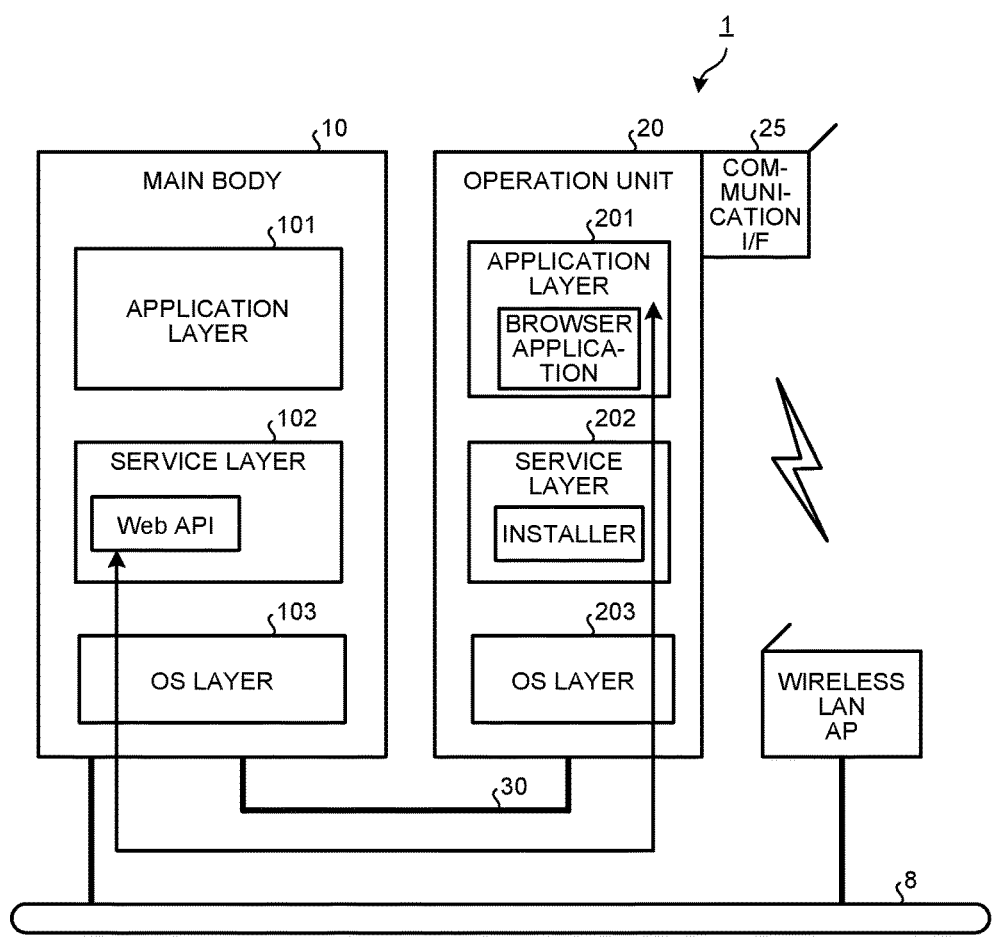
FIG. 3 is a diagram illustrating an exemplary software structure of the MFP.

The following describes a software structure of the MFP 1. FIG. 3 is a schematic diagram illustrating an exemplary software structure of the MFP 1. As illustrated in FIG. 3, the main body 10 includes an application layer 101, a service layer 102, and an OS layer 103. The application layer 101, the service layer 102, and the OS layer 103 are in fact various types of software stored in the ROM 12 and the HDD 14, for example. The CPU 11 executes the various types of software to provide the various functions.

The application layer 101 is application software (in the following description, may be described simply as the "application") that causes the hardware resources to operate and provide a certain function. Examples of the application include a copy application that provides the copier function, a scanner application that provides the scanner function, a facsimile application that provides the facsimile function, and a printer application that provides the printer function.

The service layer 102, which is present between the application layer 101 and the OS layer 103, is software that provides an interface to the applications for using the hardware resources included in the main body 10. More specifically, the service layer 102 receives requests to operate the hardware resources and provides a function to arbitrate the operation requests. Examples of the operation requests received by the service layer 102 include a request for the scanner to perform reading and a request for the plotter to perform printing.

The interface function of the service layer 102 is provided to not only the application layer 101 of the main body 10 but also an application layer 201 of the operation unit 20. The application layer 201 (application) of the operation unit 20, thus, can also implement the functions using the hardware resources (e.g., the engine 17) of the main body 10 via the interface function of the service layer 102. For example, the interface function of the service layer 102 is provided through a web API.

The OS layer 103 is basic software (operating system (OS)) that provides a basic function to control the hardware included in the main body 10. The service layer 102, which is software, converts requests to use the hardware resources from the various applications into commands that the OS layer 103 can interpret, and then transfers the commands to the OS layer 103. The OS layer 103, which is software, executes the commands. As a result, the hardware resources operate in accordance with the requests from the applications.

The operation unit 20 includes the application layer 201, a service layer 202, and an OS layer 203. The hierarchical structure among the application layer 201, the service layer 202, and the OS layer 203 of the operation unit 20 is the same as that of the main body 10. The function provided by the application of the application layer 201 and the type of the operation request that can be received by the service layer 202 differ from those in the main body 10. Although the application of the application layer 201 may be software that operates the hardware resource included in the operation unit 20 to provide a certain function, the application of the application layer 201 is software that mainly provides a function of a user interface (UI) to operate or display the functions (copier, scanner, facsimile, and printer functions) included in the main body 10. In this example, the application layer 201 includes the browser application (application market application and content application) and other applications, and the service layer 202 includes the installer and other applications.

In the embodiment, the software of the OS layer 103 of the main body 10 and the software of the OS layer 203 of the operation unit 20 differ from each other in order to keep independence between the functions of the main body 10 and the operation unit 20. The main body 10 and the operation unit 20, thus, operate independently from each other under the different operating systems. For example, Linux (registered trademark) may be adopted for the software of the OS layer 103 of the main body 10 while Android (registered trademark) may be adopted for the software of the OS layer 203 of the operation unit 20.

As described above, the main body 10 and the operation unit 20 operate under different operating systems in the MFP 1 according to the embodiment. The communication between the main body 10 and the operation unit 20, thus, is not performed as an inter-process communication in the common apparatus, but as a communication between different apparatuses. Examples of the communication performed as that between different apparatuses include the operation (command communication) that transmits the information (a content of the instruction from the user) received by the operation unit 20 to the main body 10, and the operation of the main body 10 to notify the operation unit 20 of an event. The operation unit 20, thus, can use the functions of the main body 10 by performing the command communication with the main body 10. Examples of an event of which the operation unit 20 is notified by the main body 10 include an implementation state of the operation in the main body 10 and contents set by the main body 10.

In the embodiment, power is supplied to the operation unit 20 from the main body 10 via the communication path 30, thereby making it possible to perform power supply control separately (independently) for the operation unit 20 and the main body 10.

Figure 4:
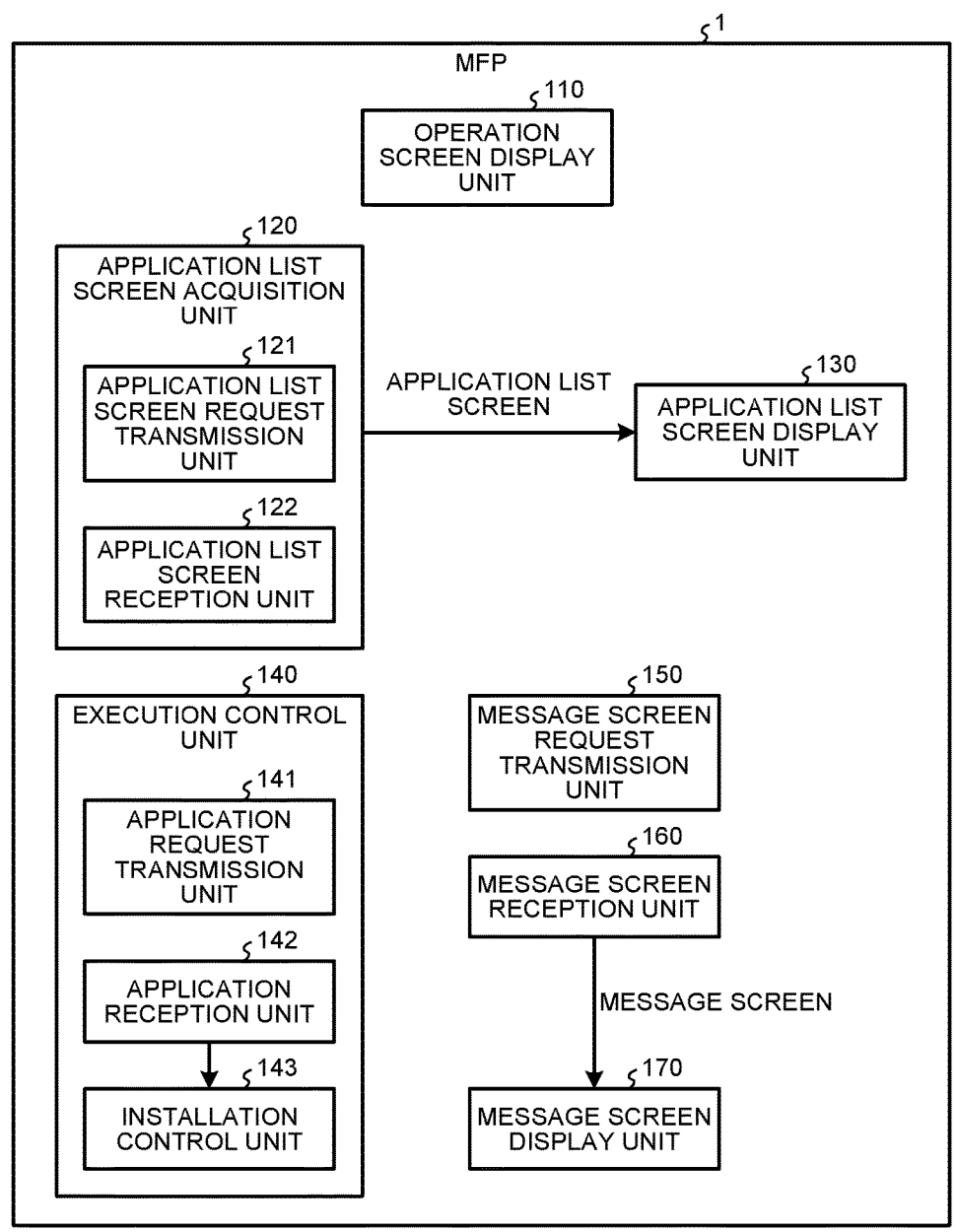
FIG. 4 is a diagram illustrating exemplary functions of the MFP.

The following describes the functions of the MFP 1. FIG. 4 is a diagram illustrating exemplary functions of the MFP 1. As illustrated in FIG. 4, the MFP 1 includes an operation screen display unit 110, an application list screen acquisition unit 120, an application list screen display unit 130, an execution control unit 140, a message screen request transmission unit 150, a message screen reception unit 160, and a message screen display unit 170. For convenience sake, FIG. 4 mainly illustrates functions relating to the present embodiment. However, the functions of the MFP 1 are not limited thereto.

Figure 5:
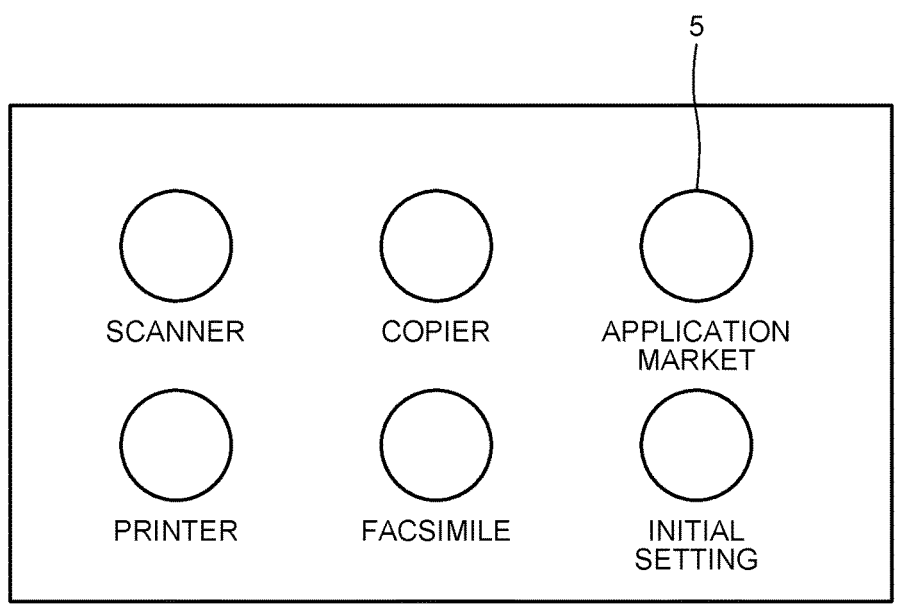
FIG. 5 is a diagram illustrating an exemplary operation screen.

The operation screen display unit 110 controls display on the operation panel 27 of operation screens for performing various types of operation. FIG. 5 is a diagram illustrating an exemplary operation screen. On the operation screen, an icon 5 that starts the application market application is displayed.

The following further describes FIG. 4. The application list screen acquisition unit 120 includes an application list screen request transmission unit 121 and an application list screen reception unit 122. The application list screen request transmission unit 121 is an example of an "application list screen request transmission unit". The application list screen request transmission unit 121 transmits, to the server system 2, an application list screen request for requesting an application list screen including a button to which an installation instruction to install an application is attached, for each of the applications. In this example, the application list screen request includes device identification (ID) for identifying the MFP 1 that is a requestor. The application list screen reception unit 122 is an example of an "application list screen reception unit". The application list screen reception unit 122 receives the application list screen from the server system 2.

In the present embodiment, when a user touches the icon 5, the browser application (application list screen request transmission unit 121) transmits the application list screen request described above to the server system 2. The browser application (application list screen reception unit 122) receives the application list screen from the server system 2 as a response to the application list screen request.

Figures 6, 7:
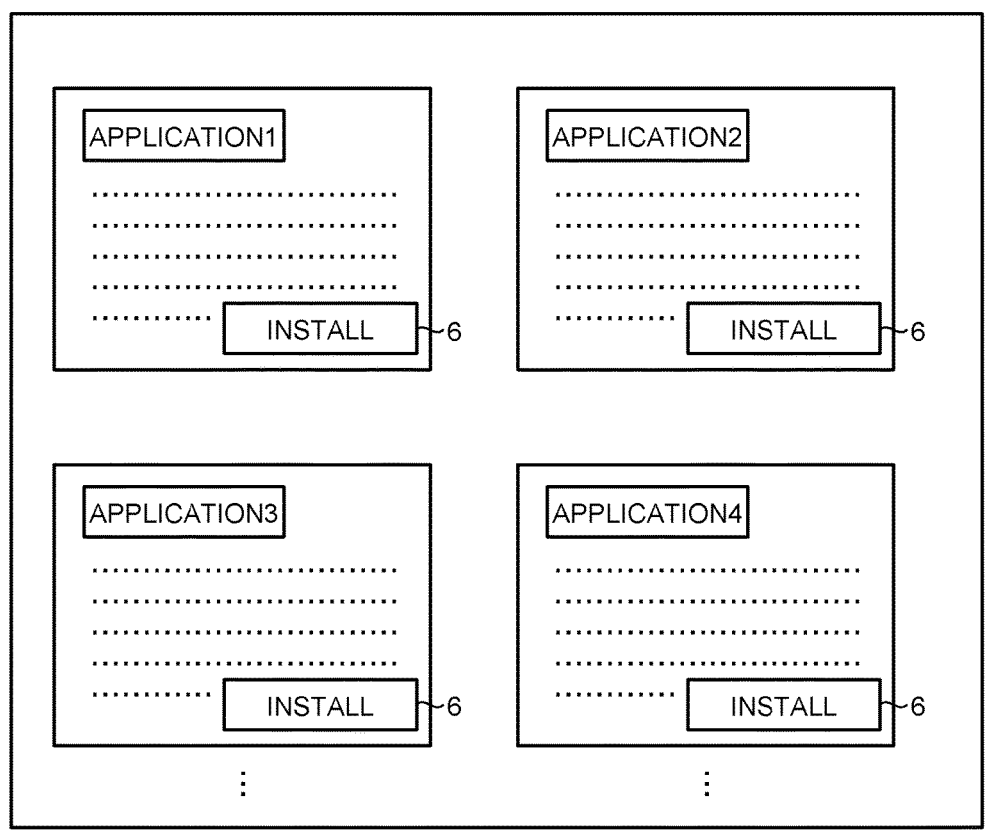
FIG. 6 is a diagram illustrating an exemplary application list screen.
FIG. 7 is a diagram illustrating an exemplary URL scheme.

FIG. 6 is a diagram illustrating an exemplary application list screen. In the example illustrated in FIG. 6, the application list screen displays, for each of the applications, descriptive information that describes details of the specific application and a button 6 (hereinafter referred to as an "install button 6") for instructing to install the application. In this example, a URL scheme that describes a procedure to execute the installation instruction is attached to the install button 6.

FIG. 7 is a diagram illustrating an exemplary URL scheme attached to the install button 6 corresponding to the application that is identified by an ID (application ID) of "49354". The portion of "installer" in FIG. 7 is a header portion of the URL scheme. The header portion of the URL scheme may hereinafter be referred to as a "scheme portion". In the example of FIG. 7, the scheme portion of the "installer" represents information for identifying the application that executes the installation instruction, and in this example, the scheme portion indicates the installer loaded in the MFP 1. Additionally, the portion of "installApp" of "installApp?id=49354" in FIG. 7 is an installation instruction, and an argument of the installation instruction is "id=49354". Specifically, the portion of "installApp" represents the installation instruction of the application that is identified by an id of "49354". More specifically, the portion of "installApp" indicates specific details of the instruction. In other words, the URL scheme illustrated in FIG. 7 is information that describes the installation instruction execution procedure in URL format. Selecting this URL scheme starts the installer, causing the installer to install the application that is identified by the id of "49354" to be executed.

The following further describes FIG. 4. The application list screen display unit 130 performs control to display the application list screen received by the application list screen reception unit 122. In this example, the application list screen display unit 130 performs control to display the application list screen received by the application list screen reception unit 122 on the operation panel 27.

The execution control unit 140 executes an installation instruction the execution procedure of which is described by the URL scheme attached to the install button 6 pressed by the user among the install buttons 6 on the application list screen. As illustrated in FIG. 4, in the present embodiment, the execution control unit 140 includes an application request transmission unit 141, an application reception unit 142, and an installation control unit 143.

The application request transmission unit 141 transmits, to the server system 2, an application request for requesting the application corresponding to the installation instruction attached to the install button 6 pressed by the user. In this example, the application request includes the device ID for identifying the MFP 1 that is the requestor. The application reception unit 142 receives the application corresponding to the application request from the server system 2. The installation control unit 143 performs control to install the application received by the application reception unit 142 in the MFP 1.

For example, if the user presses the install button 6 of any of the applications on the application list screen, the browser application notifies the OS of the operation unit 20, of the URL scheme attached to the install button 6. The OS of the operation unit 20 confirms the notified URL scheme, and confirms that the application that executes the instruction (in this example, the installation instruction) the execution procedure of which is described by the URL scheme, is the installer. The OS of the operation unit 20 then transmits the URL scheme to the installer. The installer that has received the URL scheme from the OS of the operation unit 20 executes the installation instruction the execution procedure of which is described by the URL scheme. For example, if the URL scheme attached to the install button 6 pressed by the user is formed as in FIG. 7, the installer transmits, to the server system 2, an application request for requesting an application that is identified by the application ID of "49354", and then receives the application from the server system 2. The installer then performs control to install the application received (downloaded) from the server system 2 in the MFP 1. In this example, the installer provides the function of the execution control unit 140 described above.

The following further describes FIG. 4. The message screen request transmission unit 150 transmits, to the server system 2, a message screen request for requesting a message screen, which will be described below. In this example, the message screen request includes the device ID for identifying the MFP 1 that is the requestor. The timing of transmitting the message screen request is optional, and in this example, the message screen request transmission unit 150 transmits the message screen request to the server system 2, every time a predetermined time has passed. The length of the predetermined time may be optionally set (for example, the length of the predetermined time may be variably set, according to the user operation).

The message screen reception unit 160 receives the message screen from the server system 2. The message screen display unit 170 performs control to display the message screen received by the message screen reception unit 160. In this example, the message screen display unit 170 performs control to display the message screen received by the message screen reception unit 160 on the operation panel 27. The details of the message screen will be described below.

Figure 8:
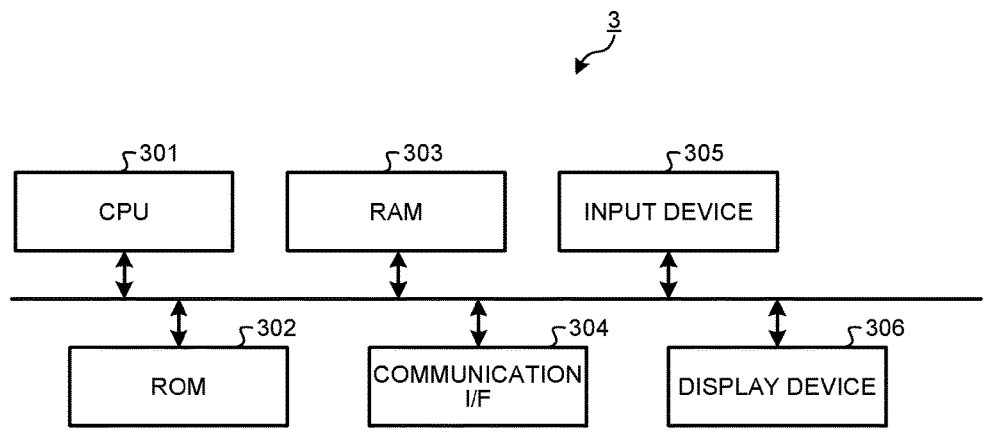
FIG. 8 is a diagram illustrating an exemplary hardware structure of an application market server and a content center.

Next, specific structure of the application market server 3 and the content center 4 included in the server system 2 will be described. FIG. 8 is a diagram illustrating an exemplary hardware structure of the application market server 3. It is to be noted that the hardware structure of the content center 4 is the same as that of FIG. 8.

As illustrated in FIG. 8, the application market server 3 includes a CPU 301, a ROM 302, a RAM 303, a communication I/F 304, an input device 305, and a display device 306. The CPU 301 integrally controls operation of the application market server 3. The ROM 302 is a non-volatile memory and stores therein computer programs and various other types of data. The RAM 303 is a volatile memory that functions as a work area for various types of processing performed by the CPU 301. The communication I/F 304 is an interface to connect the application market server 3 to the network 8. The input device 305 is a device, such as a keyboard and a mouse, with which the user performs input operation. The display device 306 is a device, such as a liquid crystal display device, on which various types of information are displayed.

Figure 9:
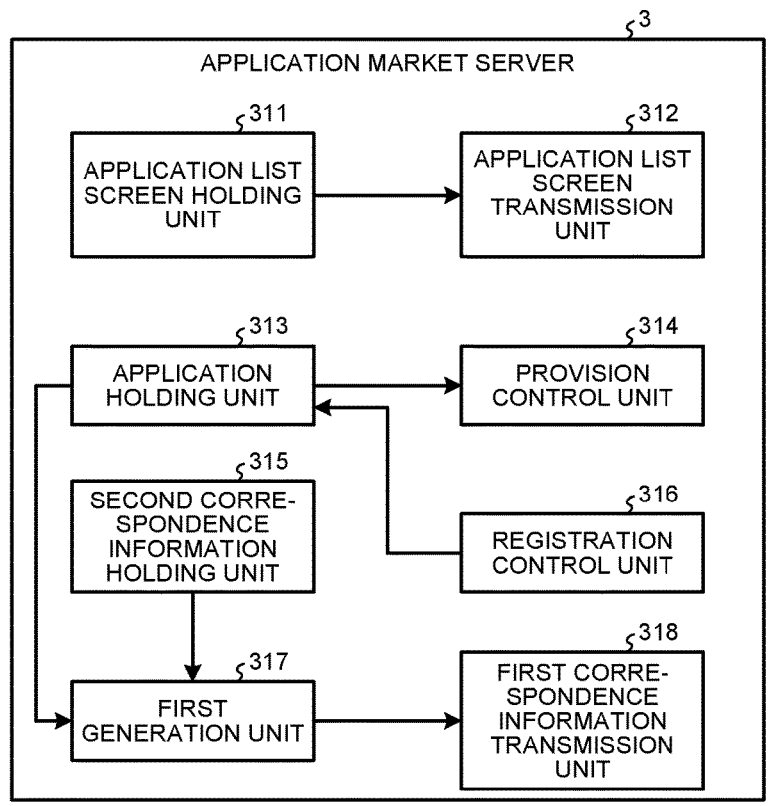
FIG. 9 is a diagram illustrating exemplary functions of the application market server.

FIG. 9 is a diagram illustrating exemplary functions of the application market server 3. As illustrated in FIG. 9, the application market server 3 includes an application list screen holding unit 311, an application list screen transmission unit 312, an application holding unit 313, a provision control unit 314, a second correspondence information holding unit 315, a registration control unit 316, a first generation unit 317, and a first correspondence information transmission unit 318. For convenience sake, FIG. 9 mainly illustrates functions relating to the present embodiment. However, the functions of the application market server 3 are not limited thereto.

The application list screen holding unit 311 is an example of an "application list screen holding unit". The application list screen holding unit 311 holds an application list screen. The application list screen transmission unit 312 is an example of an "application list screen transmission unit". The application list screen transmission unit 312 transmits the application list screen to the MFP 1 in response to the application list screen request from the MFP 1.

The application holding unit 313 holds the applications. At least an application to be displayed on the application list screen is included in the applications held by the application holding unit 313.

The provision control unit 314 performs control to provide any of the applications held by the server system 2 (application holding unit 313) to the MFP 1. In this example, the provision control unit 314 transmits any of the applications (applications held by the application holding unit 313) to the MFP 1 in response to the application request from the MFP 1. As described above, the application request in the present embodiment includes the device ID for identifying the MFP 1 that is the requestor. Thus, the application market server 3 can manage the correspondence relation between the device ID and the application having already been provided.

The second correspondence information holding unit 315 holds second correspondence information in which each MFP 1 is associated with an application having already been provided to the MFP 1. In this example, the second correspondence information holding unit 315 holds information in which each device ID for identifying the MFP 1 is associated with application information that can specify the application having already been provided as well as the date and time the application is provided, as the second correspondence information. However, it is not limited thereto. FIG. 10 is a diagram illustrating exemplary second correspondence information according to the present embodiment. In this example, the provision control unit 314 has a function to update the second correspondence information, every time the provision control unit 314 performs control to provide an application to the MFP 1.

The following further describes FIG. 9. The registration control unit 316 performs control to register a new application in the application holding unit 313, corresponding to an operation of the user (manager and the like who has an authority to register the application).

The first generation unit 317 generates first correspondence information in which each MFP 1 is associated with an application not yet provided to the MFP 1.

For example, the first generation unit 317 specifies, for each MFP 1, the application not yet provided to the MFP 1 among the applications held by the application holding unit 313 based on the second correspondence information, to thereby generate the first correspondence information in which the MFP 1 is associated with the specified application. For convenience sake, this generation pattern is referred to as a "first pattern".

Alternatively, the first generation unit 317 specifies, for each MFP 1, the application not yet provided to the MFP 1 but already provided to a certain number or more of other MFPs 1 (an MFP 1 different from the concerned MFP 1) among the applications held by the application holding unit 313 based on the second correspondence information, to thereby generate the first correspondence information in which the MFP 1 is associated with the specified application. For convenience sake, this generation pattern is referred to as a "second pattern". The certain number described above may be set optionally, and for example, the number corresponding to 70% of the whole (this is just an example, and is not limited thereto) may be set as the certain number described above.

Still alternatively, for example, if a new application is registered in the application holding unit 313 by the registration control unit 316, the first generation unit 317 can also generate the first correspondence information in which each MFP 1 is associated with the registered new application. For convenience sake, this generation pattern is referred to as a "third pattern".

The first generation unit 317 may generate the first correspondence information by adopting any one of the first pattern to third pattern described above, or may generate the first correspondence information by combining any two or more of the first pattern to third pattern. The timing of generating the first correspondence information is optional. For example, if the first pattern described above or the second pattern described above is adopted, the first generation unit 317 may generate (update) the first correspondence information, every time a predetermined time (may be set optionally) has passed, based on the latest second correspondence information. For example, if the third pattern described above is adopted, the first generation unit 317 may generate (update) the first correspondence information, every time a new application is registered in the application holding unit 313 by the registration control unit 316.

In this example, the first correspondence information is information in which each device ID is associated with the message information (corresponds to information indicating an application not yet provided to the MFP 1). The message information serves as a source of the message screen that is a screen used to notify the user of an application not yet provided to the MFP 1, which is identified by the device ID. However, it is not limited thereto. FIG. 11 is a diagram illustrating a correspondence relation between the device ID of "1003" and the message information (diagram of a portion illustrating a correspondence relation between the device ID of "1003" and the message information, in the first correspondence information). In the example of FIG. 11, the device ID of "1003" is associated with the message information serving as a source of the message screen to notify the user of an "easy print application" that is not yet provided. In the example of FIG. 11, a character string of "newly arrived application information" and a character string of "easy print application has been released" are included as message information. These character strings allows the registration control unit 316 to notify the user that the "easy print application" is registered anew. An image indicating an icon image of the "easy print application" is also included as the message information. A character string of "for more details, tap here!" to guide the user to the detailed information of the "easy print application", and a character string of "https://xxx.com" that is a link to a Web page, are also included as the message information. Understandably, however, the form of the message information is optional, and is not limited thereto.

The following further describes FIG. 9. The first correspondence information transmission unit 318 transmits the first correspondence information generated by the first generation unit 317 to the content center 4. The timing of transmitting the first correspondence information is optional. For example, the latest first correspondence information may be transmitted to the content center 4, every time a predetermined time (may be set optionally) has passed. The latest first correspondence information may also be transmitted to the content center 4, every time a new application is registered in the application holding unit 313 by the registration control unit 316. Further, the latest first correspondence information may be transmitted to the content center 4, when a first correspondence information request for requesting the first correspondence information is received from the content center 4. In this example, the first correspondence information transmission unit 318 transmits the latest first correspondence information to the content center 4, when a new application is registered in the application holding unit 313. However, it is not limited thereto.

The functions of the application market server 3 described above (functions of the application list screen transmission unit 312, the provision control unit 314, the registration control unit 316, the first generation unit 317, the first correspondence information transmission unit 318, and the like) are implemented, when the CPU 301 executes the computer programs stored in the storage device such as the ROM 302. However, it is not limited thereto, and for example, a dedicated hardware circuit may implement at least a part of the functions. The application list screen holding unit 311, the application holding unit 313, the second correspondence information holding unit 315, and the like described above may also be implemented by the storage device such as the ROM 302.

Figure 12:
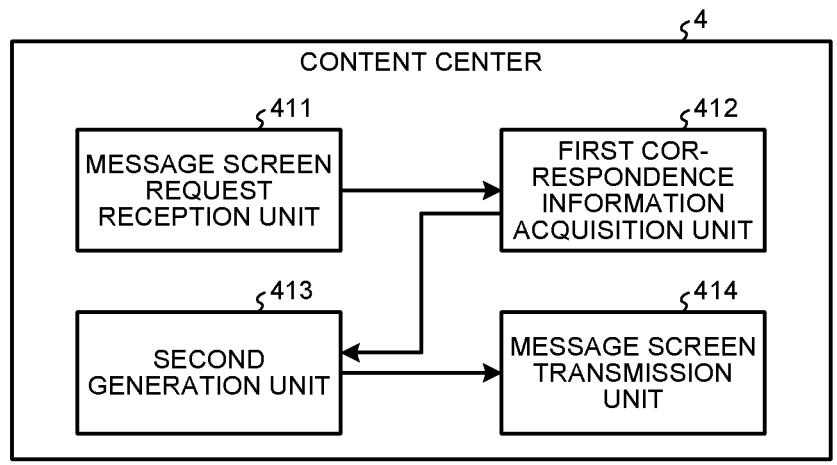
FIG. 12 is a diagram illustrating exemplary functions of the content center.

FIG. 12 is a diagram illustrating exemplary functions of the content center 4. As illustrated in FIG. 12, the content center 4 includes a message screen request reception unit 411, a first correspondence information acquisition unit 412, a second generation unit 413, and a message screen transmission unit 414.

The message screen request reception unit 411 receives a message screen request for requesting a message screen that is a screen used to notify the user of an application not yet provided to the MFP 1, from the MFP 1. The first correspondence information acquisition unit 412 acquires the first correspondence information from the application market server 3. As described above, in this example, when a new application is registered in the application holding unit 313, the application market server 3 (first correspondence information transmission unit 318) transmits the latest first correspondence information to the content center 4. Thus, the first correspondence information acquisition unit 412 can acquire the first correspondence information. Understandably, however, the method for acquiring the first correspondence information is not limited thereto, and may be optionally changed.

The second generation unit 413 generates a message screen corresponding to the MFP 1 that is the requestor of the message screen request received by the message screen request reception unit 411. The message screen is generated based on the first correspondence information (in other words, the first correspondence information generated by the first generation unit 317) acquired by the first correspondence information acquisition unit 412. In this example, the second generation unit 413 generates a message screen corresponding to the MFP 1 (MFP 1 that is the requestor of the message screen request), which is identified by the device ID. The message screen is generated based on the message information associated with the device ID that matches with the device ID included in the message screen request received by the message screen request reception unit 411, among the device IDs included in the first correspondence information acquired by the first correspondence information acquisition unit 412. For example, the message screen generated based on the message information illustrated in FIG. 11 becomes as in FIG. 13.

The message screen may also be data obtained by adding, to an image file, information (such as URL) indicating a link as meta information. In this case, for example, the message screen is configured of a combination of image data and a URL in text format. The message screen may also be configured of a combination of an html file that defines the layout of a text and an image to be displayed, and image data.

Figure 13:
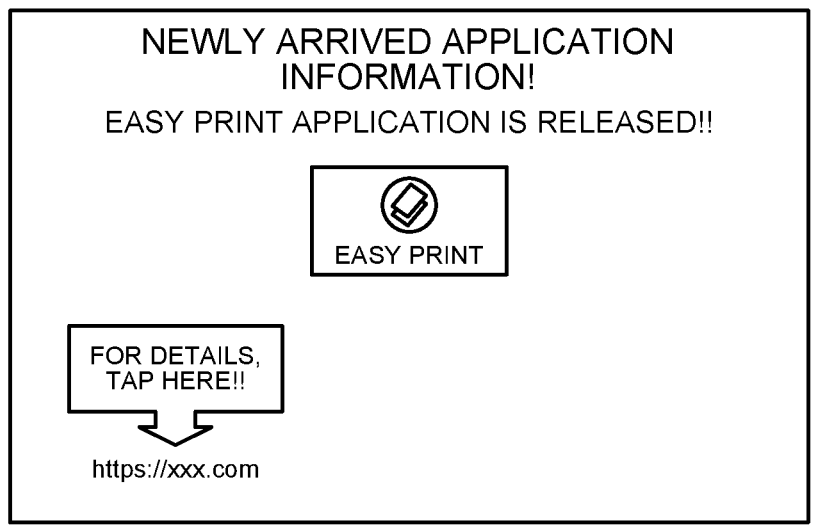
FIG. 13 is a diagram illustrating an exemplary message screen.
Figure 14:
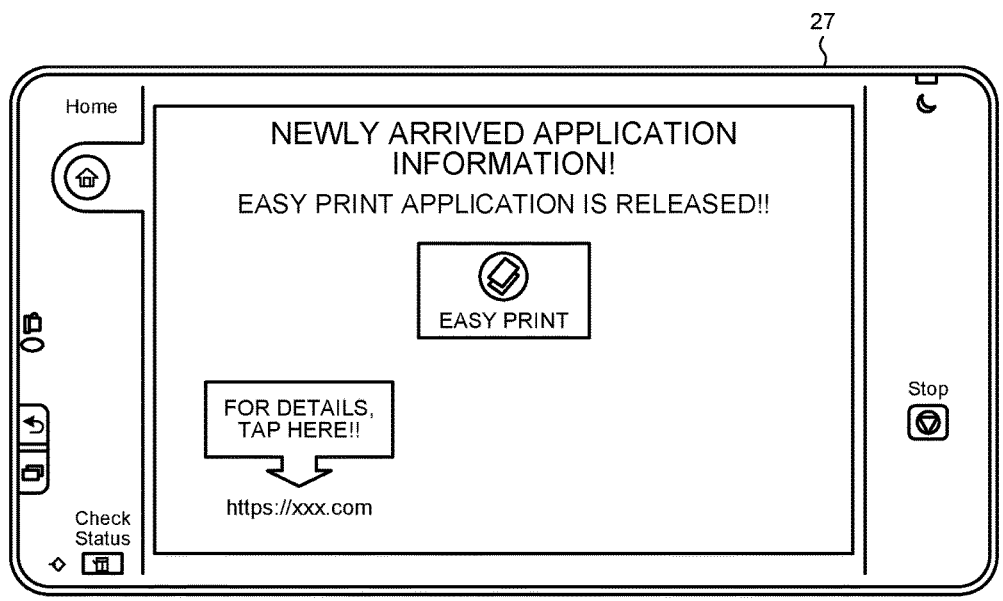
FIG. 14 is a diagram illustrating an exemplary message screen displayed on an operation panel.

The message screen transmission unit 414 transmits the message screen generated by the second generation unit 413 to the MFP 1, in response to the message screen request from the MFP 1. More specifically, the message screen transmission unit 414 transmits the message screen generated by the second generation unit 413 to the MFP 1, which is identified by the device ID, included in the message screen request, in response to the message screen request received by the message screen request reception unit 411. The MFP 1 that is the requestor of the message screen request displays the message screen received from the content center 4 on the operation panel 27. For example, if the message screen received from the content center 4 is as illustrated in FIG. 13, the MFP 1 displays the received message screen on the operation panel 27, as in FIG. 14.

The functions of the content center 4 described above (functions of the message screen request reception unit 411, the first correspondence information acquisition unit 412, the second generation unit 413, the message screen transmission unit 414, and the like) are implemented, when the CPU 301 executes the computer programs stored in the storage device such as the ROM 302. Understandably, however, it is not limited thereto, and a dedicated hardware circuit may implement at least a part of the functions.

Figure 15:
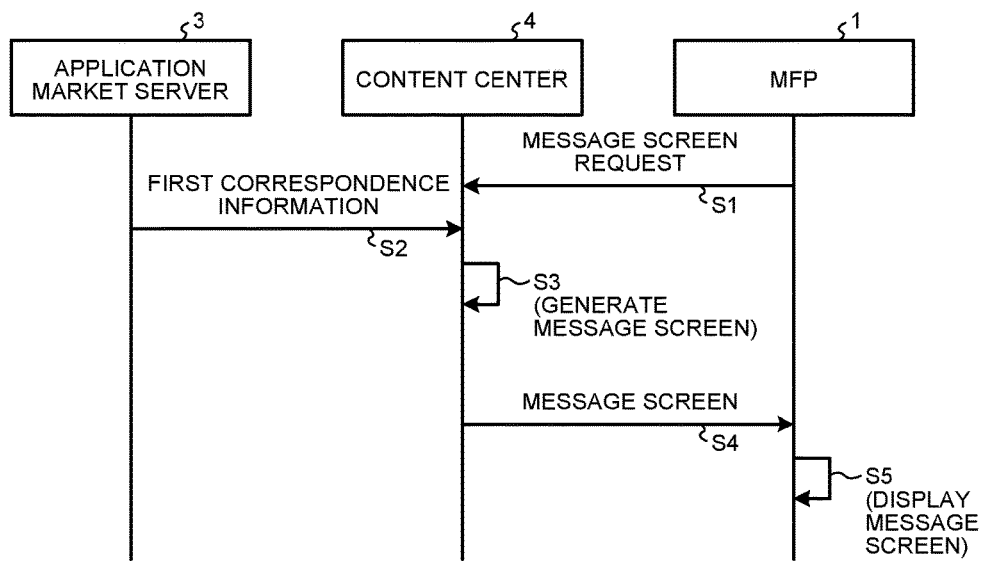
FIG. 15 is a sequence diagram illustrating exemplary operation steps of the information processing system.

FIG. 15 is a sequence diagram illustrating exemplary operation steps of the information processing system 100 according to the present embodiment. As illustrated in FIG. 15, the MFP 1 transmits the message screen request described above to the content center 4 (step S1).

As described above, when a new application is registered in the application holding unit 313, the application market server 3 transmits first correspondence information to the content center 4 (step S2). The content center 4 then receives the first correspondence information from the application market server 3. The content center 4 that has received the message screen request at step S1 described above, generates a message screen corresponding to the MFP 1 that is the requestor of the message screen request, based on the first correspondence information that has already been received from the application market server 3 (step S3). The content center 4 then transmits the message screen generated at step S3 to the MFP 1 (step S4), in response to the message screen request from the MFP 1. The MFP 1 (MFP 1 that is the requestor of the message screen request) that has received the message screen from the content center 4 displays the received message screen on the operation panel 27 (step S5). Specific details of the steps are the same as those described above.

Even if the application market server 3 (first correspondence information transmission unit 318) transmits the latest first correspondence information to the content center 4 at the certain time, in other words, even if the content center 4 (first correspondence information acquisition unit 412) acquires the first correspondence information at the certain time, the sequence diagram illustrating exemplary operation steps of the information processing system 100 becomes as in FIG. 15.

Figure 16:
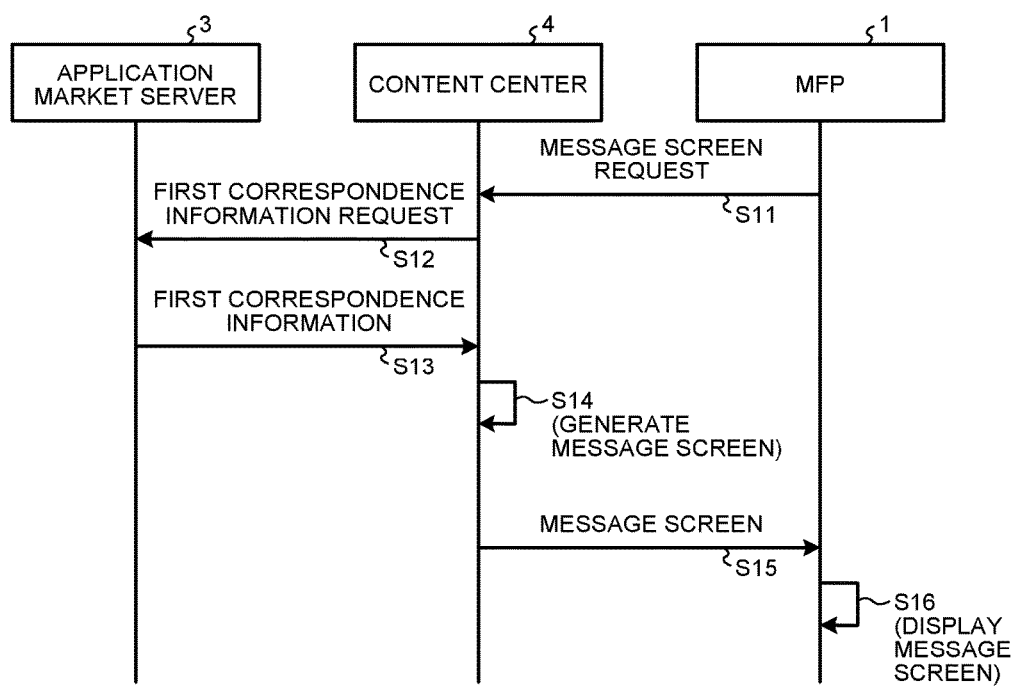
FIG. 16 is a sequence diagram illustrating exemplary operation steps of the information processing system of a modification.

For example, if the content center 4 (first correspondence information acquisition unit 412) transmits a first correspondence information request for requesting the first correspondence information to the application market server 3, and receives (acquires) the first correspondence information as a response to the first correspondence information request, when the message screen request reception unit 411 receives the message screen request, the sequence diagram illustrating exemplary operation steps of the information processing system 100 becomes as in FIG. 16. As illustrated in FIG. 16, the MFP 1 transmits the message screen request described above to the content center 4 (step S11). The content center 4 that has received the message screen request from the MFP 1 transmits the first correspondence information request described above to the application market server 3 (step S12). The content center 4 then receives the first correspondence information as a response to the first correspondence information request (step S13). The following processing from step S14 to step S16 are the same as the processing from step S3 to step S5 illustrated in FIG. 15.

As described above, the server system 2 according to the present embodiment generates the message screen corresponding to the MFP 1 that is the requestor of the message screen request described above, based on the first correspondence information in which each MFP 1 is associated with an application not yet provided to the MFP 1. The server system 2 then transmits the generated message screen to the MFP 1 that is the requestor. The MFP 1 that is the requestor then displays the message screen received from the server system 2. Consequently, the user of the MFP 1 that is the requestor can speedily and easily confirm the application that the user has not used before, by confirming the message screen displayed on the operation panel 27. In other words, according to the present embodiment, it is possible to achieve advantageous effects of preventing a user from overlooking an application useful to the user or an application registered anew. Further, according to the present embodiment, the workload of the user can be reduced significantly. This is because the user need not browse the entire application list screen in which the applications that the user has already used are mixed with the applications that the user has never used before, and confirm whether there is a useful application or an application registered anew (in other words, the application that the user has never used before) the user has overlooked before.

Second Embodiment

The following describes a second embodiment. The following omits descriptions of portions common to the first embodiment as appropriate.

Figures 17, 18:
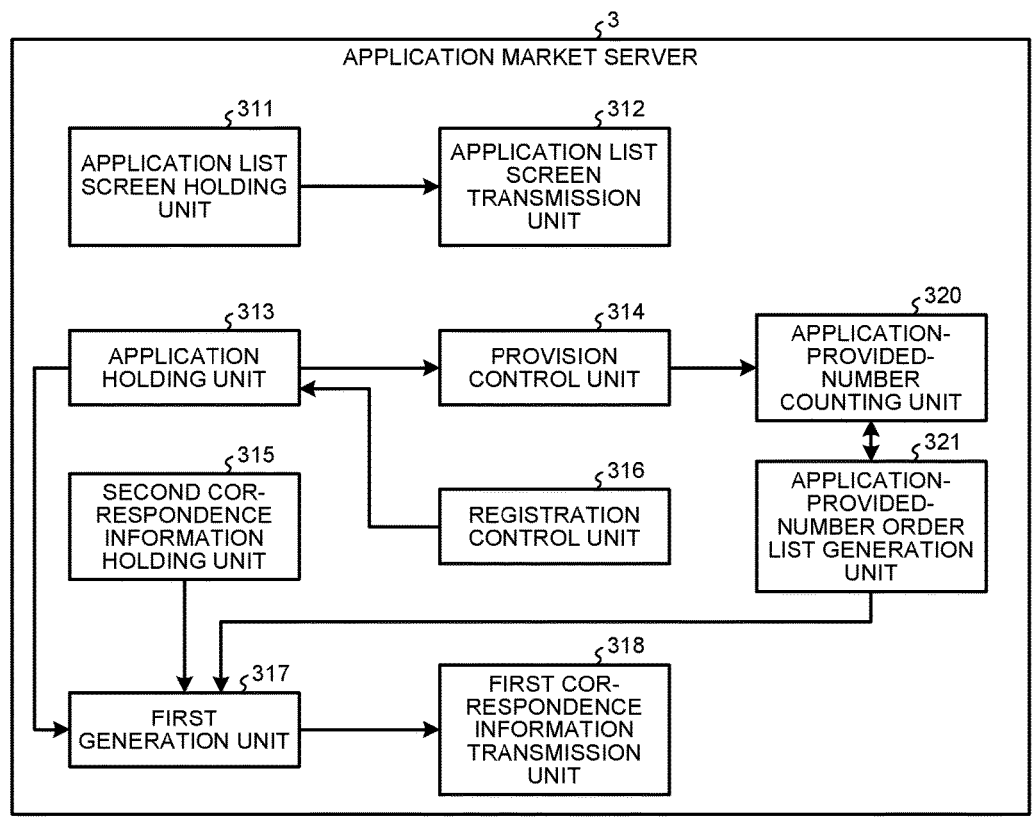
FIG. 17 is a diagram illustrating exemplary functions of the application market server according to a second embodiment.
FIG. 18 is a diagram illustrating exemplary application provided information.

In the present embodiment, the first generation unit 317 of the application market server 3 specifies, for each MFP 1, the application that is not yet provided to the MFP 1 but already provided to a certain number or more of other MFPs 1 among the applications held by the application holding unit 313 based on the second correspondence information described above, to generate the first correspondence information in which the MFP 1 is associated with the message information serving as a source of the message screen in which the specified applications are arranged in descending order of the number of provisions of an application. FIG. 17 is a diagram illustrating exemplary functions of the application market server 3 according to the present embodiment. As illustrated in FIG. 17, the application market server 3 further includes an application-provided-number counting unit 320 and an application-provided-number order list generation unit 321.

The application-provided-number counting unit 320 counts the number of provisions of an application (the provided number) indicating how many times the application has been provided to the device), every time the application is provided to the MFP 1 by the provision control unit 314. The application-provided-number counting unit 320 then updates application provided information in which each application is associated with the provided number. FIG. 18 is a diagram illustrating exemplary application provided information. In the example of FIG. 18, the application provided information is information in which each application name that identifies the application is associated with the provided number. In this example, the application-provided-number counting unit 320 manages (holds) the application provided information.

The application-provided-number order list generation unit 321 regularly acquires the application provided information described above from the application-provided-number counting unit 320, and generates a list in which the applications are arranged in descending order of the provided number (hereinafter referred to as an "application-provided-number order list"). In this example, the application-provided-number order list generation unit 321 manages (holds) the application-provided-number order list.

As explained in the first embodiment described above, the first generation unit 317 specifies, for each MFP 1, the application that is not yet provided to the MFP 1 but already provided to a certain number or more of other MFPs 1 among the applications held by the application holding unit 313 based on the second correspondence information. The first generation unit 317 then acquires the application-provided-number order list described above from the application-provided-number order list generation unit 321. Thus, the first generation unit 317 can arrange the applications not yet provided to the MFP 1 in descending order of the provided number, by excluding the applications other than the application specified as the above, among the applications described in the application-provided-number order list, for each MFP 1. The first generation unit 317 then generates message information serving as a source of the message screen in which the applications not yet provided to the MFP 1 are arranged in descending order of the provided number (in descending order of the number of provisions to the other MFP 1), for each MFP 1. The first generation unit 317 then generates the first correspondence information in which the device ID for identifying the MFP 1 is associated with the generated message information. FIG. 19 is a diagram of a portion illustrating the correspondence relation between the device ID of "1003" and the message information, in the first correspondence information. In the example of FIG. 19, the device ID of "1003" is associated with the message information serving as a source of the message screen in which the applications not yet provided are arranged in descending order of the provided number. The message screen generated based on the message information illustrated in FIG. 19 becomes as in FIG. 20. Since the other structure is the same as that of the first embodiment described above, the detailed descriptions thereof will be omitted.

As described above, in the present embodiment, it is possible to display the message screen in which the applications not yet provided are arranged in a ranking order (in descending order of the number of provisions to the other MFP 1), on the MFP 1. Consequently, the user can acknowledge the state (number) of provisions of an application provided to the other MFP 1 that the user has not used before, by confirming the message screen.

Modification of Second Embodiment

In the second embodiment described above, the application provided information is configured separately from the second correspondence information. However, it is not limited thereto, and for example, the second correspondence information may be expanded so as to include the content of the application provided information. For example, as illustrated in FIG. 21, the second correspondence information may be formed of information in which each application name that specifies the application is associated with the number of provisions (the provided number) and the device ID for identifying the MFP 1 to which the application has been already provided.

Third Embodiment

The following describes a third embodiment. The following omits descriptions of portions common to the first embodiment as appropriate.

Figure 22:
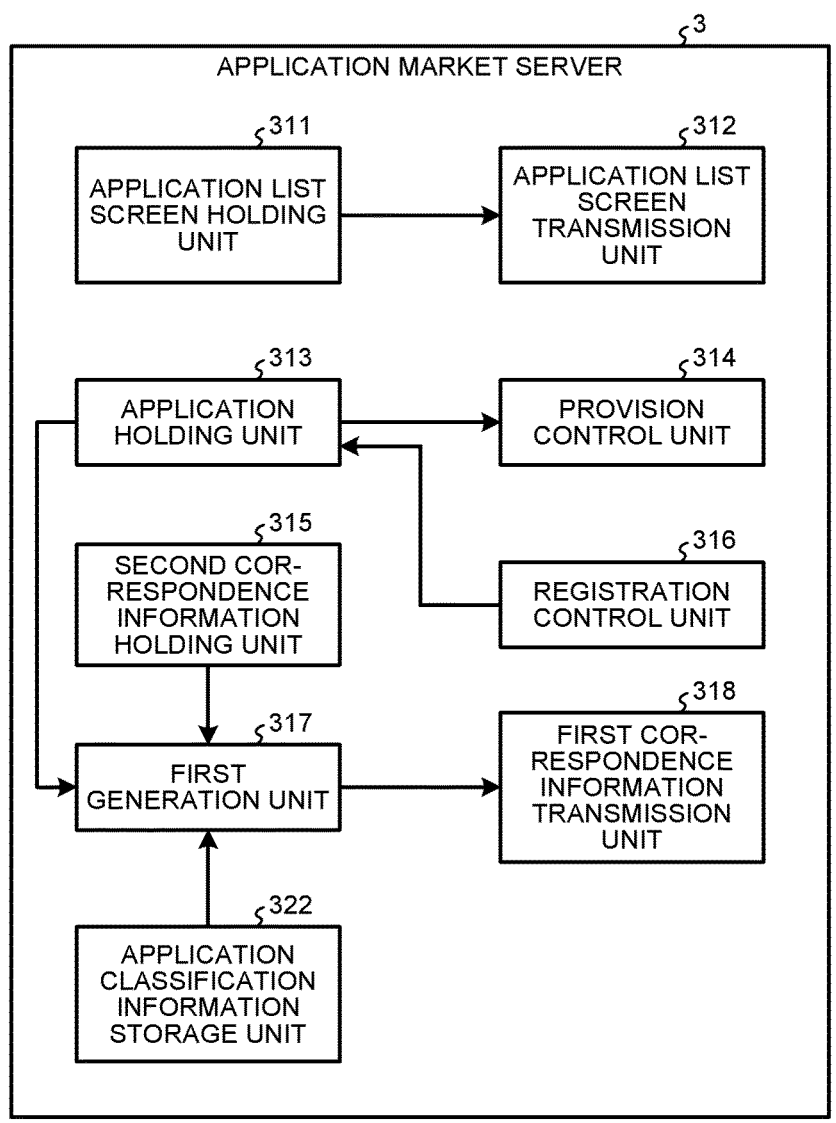
FIG. 22 is a diagram illustrating exemplary functions of the application market server according to a third embodiment.

In the present embodiment, the first generation unit 317 of the application market server 3 specifies unprovided application that is the application not yet provided to the MFP 1 but already provided to a certain number or more of other MFPs 1 among the applications held by the application holding unit 313, for each MFP 1, based on the second correspondence information described above. The first generation unit 317 then specifies, for each MFP 1, a same-category application that is an application in the same category as that of the unprovided application and is not yet provided to the MFP 1, based on the second correspondence information described above and application classification information in which each application is associated with category information of the category of the application, to generate the first correspondence information in which the MFP 1 is associated with the unprovided application and the same-category application. FIG. 22 is a diagram illustrating exemplary functions of the application market server 3 according to the present embodiment. As illustrated in FIG. 22, the application market server 3 further includes an application classification information storage unit 322.

The application classification information storage unit 322 stores therein the application classification information in which each of the applications is associated with the category information. FIG. 23 is a diagram illustrating exemplary application classification information. In the example of FIG. 23, an application name of a "name card printing application" and an application name of a "name card capturing application" are each associated with category information of the category of "name card management". Also, an application name of a "tax return application" and an application name of a "residence card copy application" are each associated with category information of the category of "public service registration". Further, an application name of an "envelope application" and an application name of a "post card application" are each associated with category information of the category of "address printing".

For example, it is assumed that the first generation unit 317 specifies the "name card printing application" as the unprovided application of the MFP 1, based on the second correspondence information described above. The first generation unit 317 refers to the application classification information stored in the application classification information storage unit 322 and confirms that the category of the specified "name card printing application" is the "name card management". The first generation unit 317 then specifies the "name card capturing application" as another application in the category of the "name card management". Then, the first generation unit 317 refers to the second correspondence information described above, and confirms whether the "name card capturing application" has already been provided to the MFP 1. If the "name card capturing application" is not yet provided, the first generation unit 317 specifies the "name card capturing application" as the same-category application. The first generation unit 317 then generates the first correspondence information in which each device ID for identifying the MFP 1 is associated with the "name card printing application" and the "name card capturing application". In this case, as explained in the first embodiment described above, the first generation unit 317 can generate, as the first correspondence information, information in which the message information serving as a source of the message screen used to notify the user of the "name card printing application" and the "name card capturing application" as applications not yet provided to the MFP 1 is associated with the device ID for identifying the MFP 1. Since the other structure is the same as that of the first embodiment described above, the detailed descriptions thereof will be omitted.

As described above, in the present embodiment, it is possible to display the message screen to notify the user of the unprovided application, which is described above, and the same-category application, which is described above, on the MFP 1. Consequently, it is possible to notify the user of the application not yet provided without fail.

Modification of Third Embodiment

Figure 24:
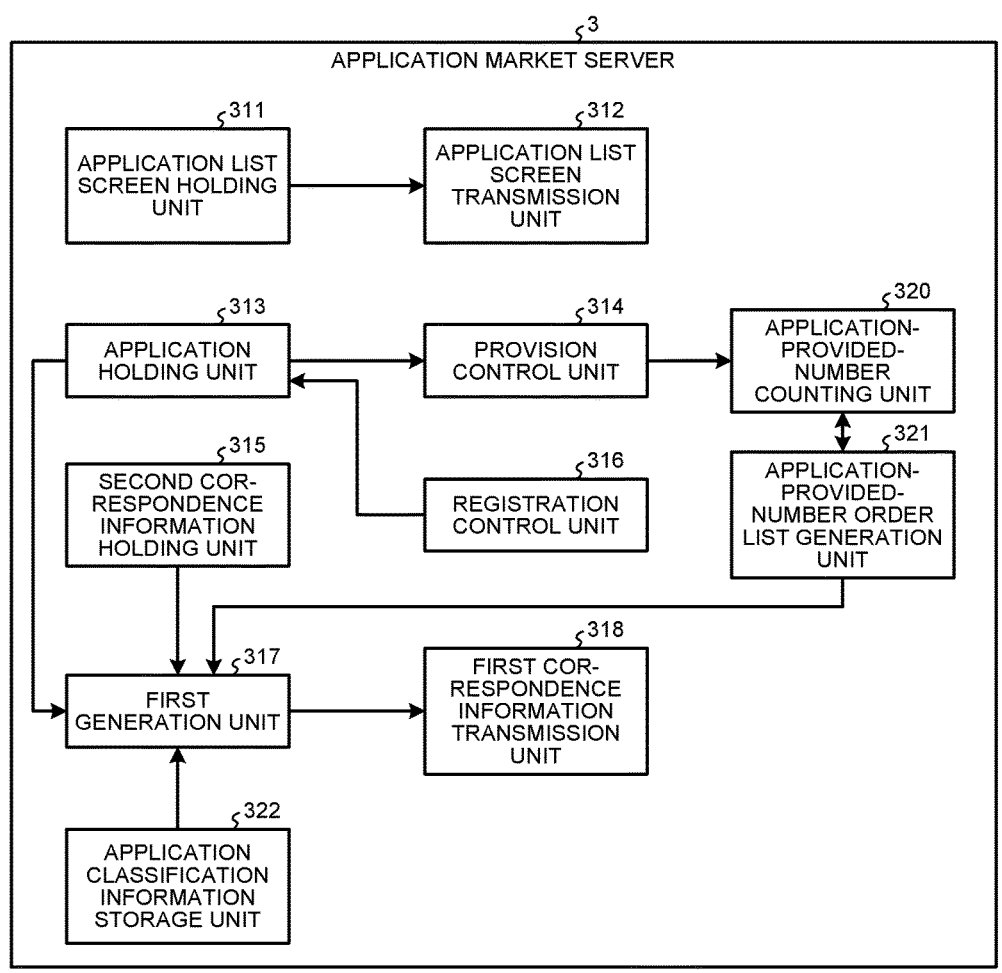
FIG. 24 is a diagram illustrating exemplary functions of the application market server of a modification according to the third embodiment.

For example, the first generation unit 317 may also generate the first correspondence information in which the MFP 1 is associated with the message information serving as a source of the message screen in which the applications corresponding to the unprovided application, which is described above, and the same-category application, which is described above, are arranged in descending order of the number of provisions (the provided number), for each category. In this case, for example, as illustrated in FIG. 24, the application market server 3 may also include the application-provided-number counting unit 320 and the application-provided-number order list generation unit 321 explained in the second embodiment described above. In this configuration, the first generation unit 317 acquires the application-provided-number order list described above from the application-provided-number order list generation unit 321, after specifying the unprovided application, which is described above, as well as the same-category application, which is described above, for each MFP 1. The first generation unit 317 can then arrange the applications not yet provided to the MFP 1 among the applications in the category, in descending order of the number of provisions. This is possible by excluding the applications other than the unprovided application, which is described above, as well as the same-category applications, which is described above (may be specified by referring to the application classification information), among the applications described in the application-provided-number order list, for each of the combinations of the MFP 1 and any of the categories. This exclusion is carried out based on the acquired application-provided-number order list and the application classification information stored in the application classification information storage unit 322. The first generation unit 317 then generates message information serving as a a source of the message screen in which the applications not yet provided to the MFP 1 (applications in the category) are arranged in descending order of the number of provisions, for each of the combinations of the MFP 1 and the category. The first generation unit 317 further generates the first correspondence information in which each device ID for identifying the MFP with the generated message information.

Figures 25, 26:
FIG. 25 is a diagram illustrating exemplary first correspondence information of the modification according to the third embodiment.
FIG. 26 is a diagram illustrating an exemplary message screen of the modification according to the third embodiment.

FIG. 25 is a diagram of a portion illustrating the correspondence relation between the device ID of "1003" and the message information, in the first correspondence information. In the example of FIG. 25, the device ID of "1003" is associated with the message information serving as a source of the message screen in which the applications not yet provided in the category of the "name card management" are arranged in descending order of the number of provisions. The message screen generated based on the message information illustrated in FIG. 25 becomes as in FIG. 26.

As described above, in the present modification, it is possible to display the message screen in which the applications not yet provided are arranged in a ranking order, on the MFP 1, for each category. Consequently, the user can acknowledge the state (number) of provisions of an application provided to the other MFP 1 that the user has never used before, for each category, by confirming the message screen.

Fourth Embodiment

The following describes a fourth embodiment. The following omits descriptions of portions common to the first embodiment as appropriate.

Figure 27:
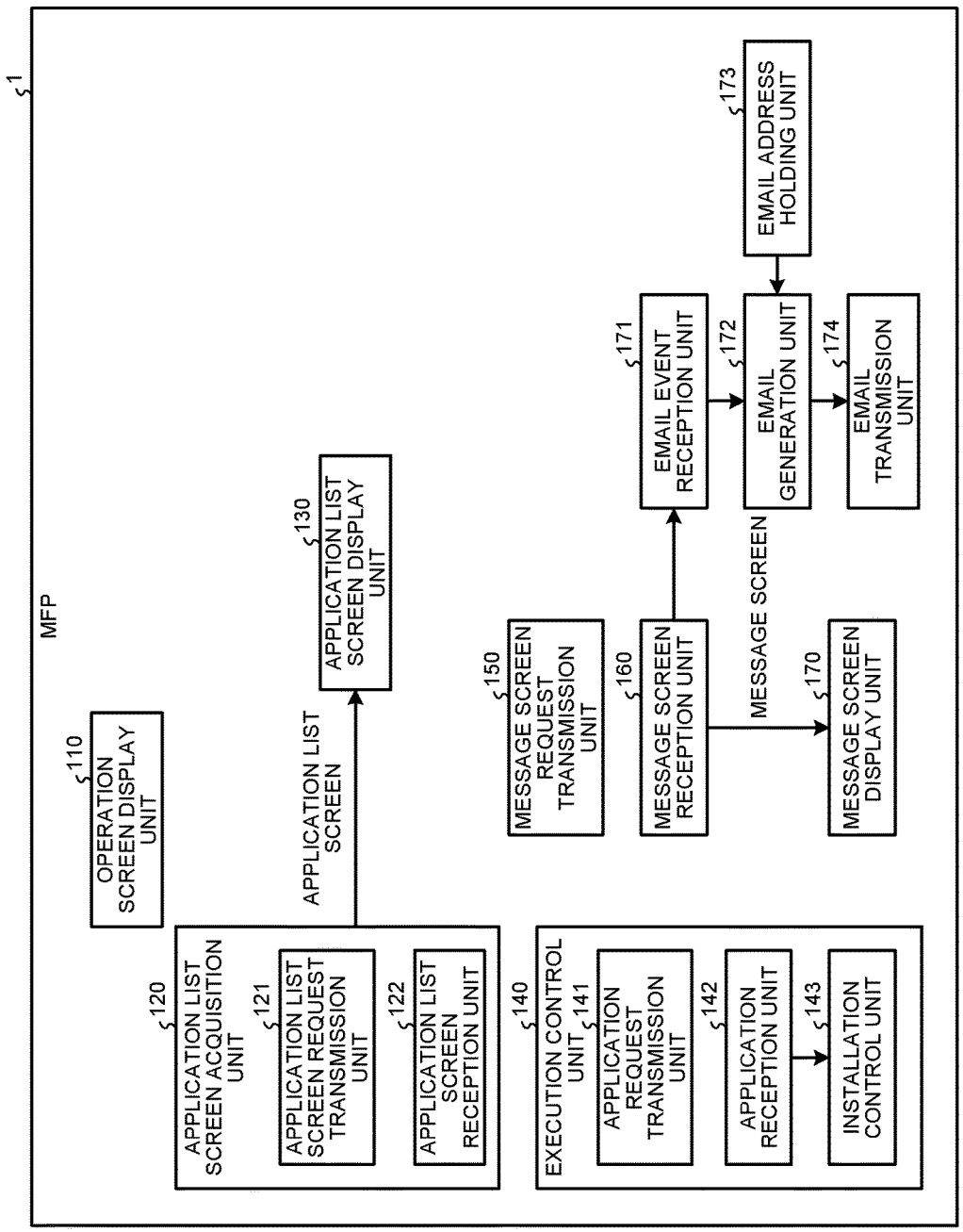
FIG. 27 is a diagram illustrating exemplary functions of the MFP according to a fourth embodiment.

In the present embodiment, the MFP 1 further includes a function (email transmission unit) to transmit an email including a message screen to an address indicated by a predetermined email address, when the message screen reception unit 160 receives the message screen. FIG. 27 is a diagram illustrating exemplary functions of the MFP 1 according to the present embodiment. As illustrated in FIG. 27, the MFP 1 further includes an email event reception unit 171, an email generation unit 172, an email address holding unit 173, and an email transmission unit 174.

Figure 28:
FIG. 28 is a diagram illustrating an exemplary email according to the fourth embodiment.

Upon receiving a message screen from the content center 4, the message screen reception unit 160 notifies the email event reception unit 171 of the received message screen, as an email event. Upon receiving the notification, the email event reception unit 171 requests the email generation unit 172 to create an email including the received message screen. Upon receiving the request, the email generation unit 172 generates an email as illustrated in FIG. 28. The email generation unit 172 then requests the email transmission unit 174 to transmit the generated email to the address indicated by a predetermined email address (such as an email address of the device manager) held by the email address holding unit 173. Upon receiving the request, the email transmission unit 174 transmits the email generated by the email generation unit 172, to the address indicated by the predetermined email address.

As described above, in the present embodiment, the MFP 1 transmits an email including the message screen to an address indicated by a predetermined email address, upon receiving the message screen from the content center 4. Consequently, for example, it is possible to notify the device manager and the like who has the predetermined address of the message screen.

In the embodiments described above, the main body 10 and the operation unit 20 operate independently of each other on the respective operating systems. This is, however, not the only possible arrangement and the main body 10 and the operation unit 20 may operate on the same operating system.

The functions of the MFP 1 described above (the operation screen display unit 110, the application list screen acquisition unit 120, the application list screen display unit 130, the execution control unit 140, the message screen request transmission unit 150, the message screen reception unit 160, and the message screen display unit 170) are implemented, when the CPU (11 or 21) executes the computer programs stored in the storage device (such as the ROM 12, the HDD 14, the ROM 22, or the flash memory 24). However, it is not limited thereto, and for example, a dedicated hardware circuit (such as a semiconductor integrated circuit) may implement at least a part of the functions of the MFP 1 described above.

Also, a single server may include the functions of the application market server 3 and the functions of the content center 4 described above, or the functions of the application market server 3 and the functions of the content center 4 described above may be dispersedly installed in three or more servers. In short, the server system 2 may include at least one or more server, and the at least one or more server may include at least a function that corresponds to the provision control unit 314 described above, a function that corresponds to the first generation unit 317, a function that corresponds to the message screen request reception unit 411 described above, a function that corresponds to the second generation unit 413 described above, and a function that corresponds to the message screen transmission unit 414 described above.

The computer program executed by the information processing system 100 (e.g., MFP 1, application market server 3, and content center 4) in the above-described embodiments may be recorded and provided in a computer-readable recording medium such as a CD-ROM, a flexible disk (FD), a CD-R, a digital versatile disc (DVD), and a USB, as an installable or executable file. The computer program executed by the information processing system 100 in the above-described embodiments may be provided or distributed via a network such as the Internet. Alternatively, various computer programs may be provided by being incorporated in, for example, a ROM in advance.

According to the present invention, it is possible to prevent a user from overlooking an application useful to the user or an application registered anew.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system, comprising:
at least one device, and
a server system that includes at least one server coupled to the at least one device via a network, the server system being configured to,
  perform control to provide any of a plurality of applications held by the server system to the at least one device,
  generate first correspondence information in which each of the at least one device is associated with message information corresponding to information indicating an application not yet provided to the at least one device, the message information including text, at least one image, and at least one hyperlink associated with the application not yet provided to the at least one device,
  receive, from the at least one device, a message screen request for requesting a message screen that is a screen used to notify a user of the application not yet provided to the at least one device,
  generate, in response to the message screen request, the message screen corresponding to the at least one device that is a requestor of the message screen request, based on the first correspondence information such that the message screen includes the text, the at least one image, and the at least one hyperlink included in the message information, and
  transmit the message screen to the at least one device, in response to the message screen request, and
wherein the at least one device is configured to,
  transmit the message screen request to the server system,
  receive the message screen from the server system, and
  perform control to display the message screen.

2. The information processing system according to claim 1, wherein the server system is further configured to,
hold the applications;
hold second correspondence information in which each of the at least one device is associated with an application having already been provided to the at least one device,
specify, for each of the at least one device, an application not yet provided to the at least one device among the applications held by server system, based on the second correspondence information, and
generate the first correspondence information wherein in the first correspondence information the at least one device is associated with the specified application.

3. The information processing system according to claim 2, wherein the server system is configured to,
specify, for each of the at least one device, the application not yet provided to the at least one device wherein the application not yet provided to the at least one device was already provided to a certain number or more of other devices,
generate the first correspondence information wherein in the first correspondence information the at least one device is associated with the specified application.

4. The information processing system according to claim 2, wherein the server system is further configured to,
specify, for each of the at least one device, the application not yet provided to the at least one device wherein the application not yet provided to the at least one device was already provided to a certain number or more of other devices, and
generate the first correspondence information wherein in the first correspondence information the at least one device is associated with message information serving as a source of the message screen in which the specified applications are arranged in descending order of number of provisions of the application.

5. The information processing system according to claim 2, wherein the server system is configured to,
specify, for each of the at least one device, the application not yet provided to the at least one device wherein an unprovided application that is the application not yet provided to the at least one device was already provided to a certain number or more of other devices.

6. The information processing system according to claim 5, wherein the server system is configured to,
specify, for each of the at least one device, a same-category application that is an application belonging to a same category as that of the unprovided application and is not yet provided to the at least one device, based on the second correspondence information and application classification information in which each application is associated with category information of a category of the application, and generate the first correspondence information wherein in the first correspondence information the at least one device is associated with the unprovided application and the same-category application.

7. The information processing system according to claim 6, wherein the server system is further configured to, generate the first correspondence information wherein in the first correspondence information the at least one device is associated with the message information for each category, the message information serving as a source of the message screen in which applications corresponding to the unprovided application and the same-category application are arranged in descending order of number of provisions of the application.

8. The information processing system according to claim 1, wherein the at least one device is further configured to transmit an email including the message screen to an address indicated by a set email address receiving the message screen.

9. The information processing system according to claim 1, wherein
the server system is further configured to,
hold the applications, and
perform control to register a new application to the server system in accordance with a user operation, and
when the new application is registered in the server system by the server system, the server system generates the first correspondence information in which each of the at least one device is associated with the registered new application.

10. The information processing system according to claim 1, wherein
the server system is further configured to,
hold an application list screen including a button to which an installation instruction of an application is attached, and
transmit the application list screen to the at least one device in response to an application list screen request for requesting the application list screen from the at least one device, and
the at least one device is further configured to,
transmit the application list screen request to the server system,
receive the application list screen from the server system,
perform control to display the application list screen, and
execute the installation instruction attached to the button pressed by the user.

11. The information processing system according to claim 10, wherein
the server system is further configured to,
transmit, to the server system, an application request for requesting an application corresponding to the installation instruction attached to the button pressed by the user,
receive, from the server system, an application corresponding to the application request, perform control to install the application in the at least one device, and
transmit any one of the applications to the at least one device in response to the application request from the at least one device.

12. An information processing method performed by an information processing system that includes at least one device and a server system provided with at least one server connected to the device via a network, the information processing method comprising:
controlling, by the server system, to provide any of a plurality of applications held by the server system to the device;
generating, by the server system, first correspondence information in which each of the at least one device is associated with message information corresponding to information indicating an application not yet provided to the device, the message information including text, at least one image, and at least one hyperlink associated with the application not yet provided to the at least one device;
receiving, by the server system, from the device, a message screen request that requests a message screen that is a screen used to notify a user of the application not yet provided to the device;
generating, by the server system in response to the message screen request, the message screen corresponding to the device based on the first correspondence information such that the message screen includes the text, the at least one image, and the at least one hyperlink included in the message information; and
transmitting, by the server system, the message screen the message screen to the device, in response to the message screen request;
transmitting, by the device, the message screen request to the server system;
receiving, by the device, the message screen from the server system; and
displaying, by the device, the message screen received at the receiving the message screen.

13. An information processing method comprising:
controlling, by a server system, to provide any of a plurality of applications held by the server system to a device;
generating, by the server system, first correspondence information associating the device with message information corresponding to information indicating an application not yet provided to the device among the plurality of applications, the message information including text, at least one image, and at least one hyperlink associated with the application not yet provided to the device;
receiving, by the server system, from the device, a message screen request requesting a message screen, the message screen being a screen used to notify a user of the application not yet provided to the device;
generating, by the server system in response to the message screen request, the message screen corresponding to the device, based on the first correspondence information such that the message screen includes the text, the at least one image, and the at least one hyperlink included in the message information; and
transmitting, by the server system, the message screen to the device, in response to the message screen request.

* * * * *